United States Patent [19]

Hotta

[11] Patent Number: 4,686,673
[45] Date of Patent: Aug. 11, 1987

[54] SYNCHRONIZING BURST TRANSMISSION PHASE CONTROL SYSTEM

[76] Inventor: Toshinori Hotta, c/o NEC Corporation, 33-1, Shiba 5-chome, Minato-ku, Tokyo, Japan

[21] Appl. No.: 700,512

[22] Filed: Feb. 11, 1985

[30] Foreign Application Priority Data

Feb. 15, 1984 [JP] Japan .................................. 59-26372
Apr. 10, 1984 [JP] Japan .................................. 59-71268

[51] Int. Cl.$^4$ .............................................. H04J 3/06
[52] U.S. Cl. .................................... 370/104; 370/100; 375/118
[58] Field of Search ................ 370/104, 100; 375/118; 455/12

[56] References Cited

U.S. PATENT DOCUMENTS 3,626,295  12/1971  Sabrui .................................. 370/104
3,982,075  9/1976   Jefferis et al. ..................... 370/104
3,995,111  11/1976  Tsuji et al. ......................... 370/104

Primary Examiner—Douglas W. Olms
Assistant Examiner—Wellington Chin

[57] ABSTRACT

A synchronizing burst transmission phase control system is provided for a SDMA/SS-TDMA system. The synchronizing burst transmission control system is constituted by a transmission timing error difference measuring means including sync window forming means for limiting a TDMA frame, a comparator comparing measured symbol length with a predetermined reference symbol length for determining a transmission timing error; control means for controlling a transmission timing of a synchronizing burst signal; and switching means for switching a symbol length of a supervisory metric pattern in accordance with the synchronous state of the synchronizing burst signal.

6 Claims, 17 Drawing Figures

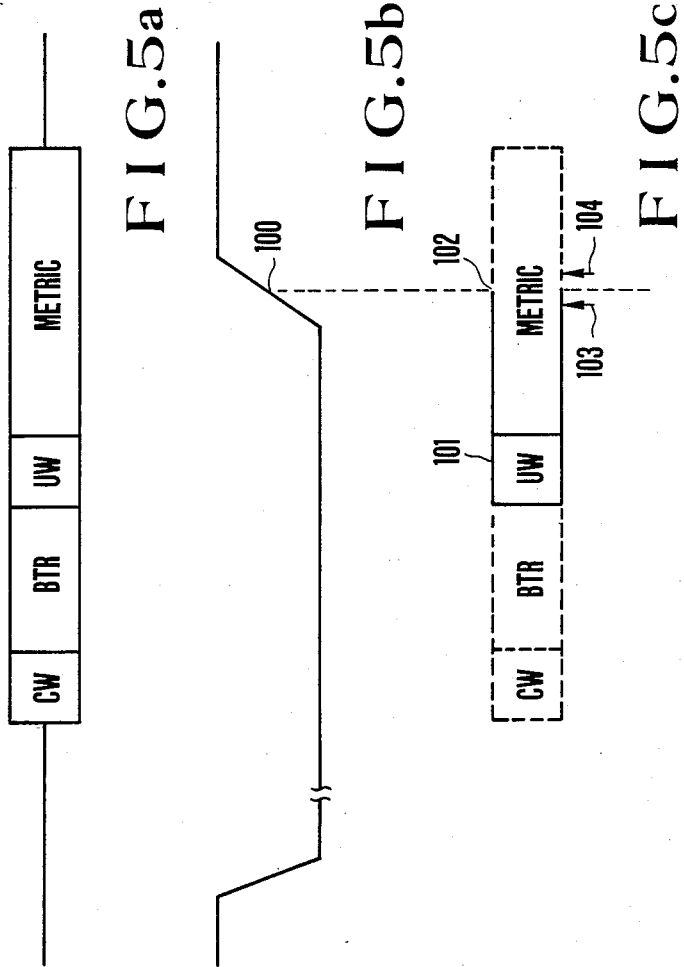

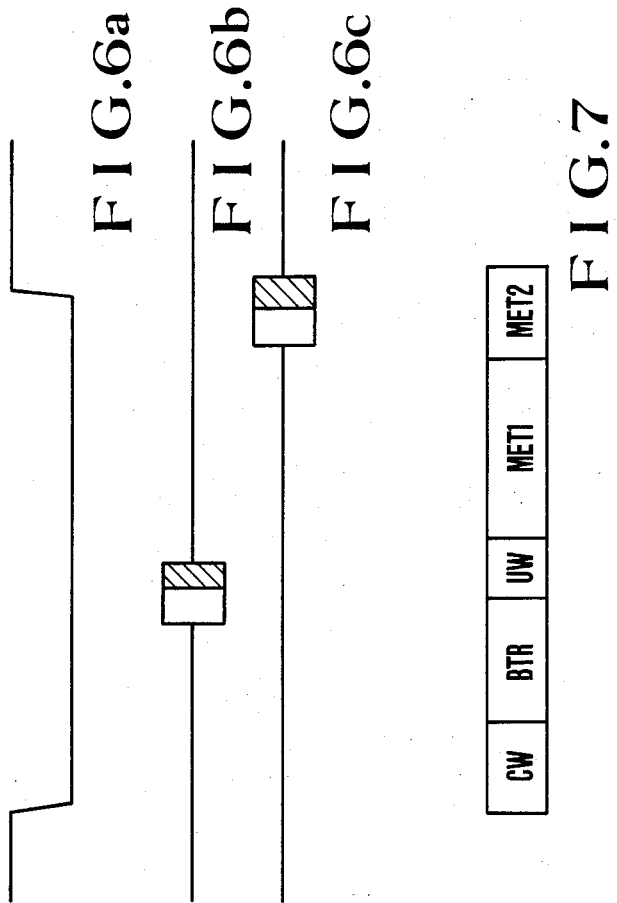

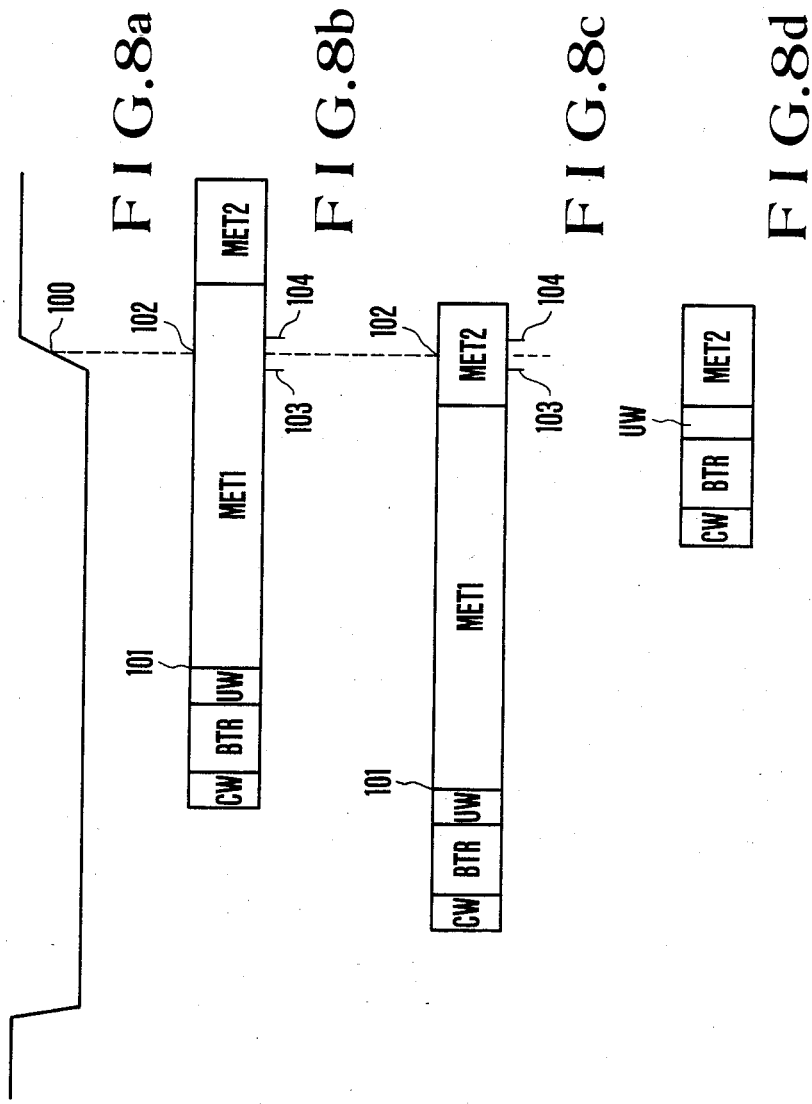

SYNCHRONIZING BURST TRANSMISSION PHASE CONTROL SYSTEM

BACKGROUND OF THE INVENTION

This invention relates to a synchronizing burst transmission phase control system, and more particularly a synchronizing burst transmission phase control system for establishing and maintaining time division multiple access (TDMA) between a plurality of earth stations which effects communications via a satellite by utilizing a space division multiple access (SDMA)/satellite switching (SS)-TDMA system.

The SDMA/SS-TDMA system is expected to be used extensively in future as the satellite communication system comprising a large capacity satellite and a plurality of earth stations.

As will be described subsequently, a member of satellite communication systems have been developed and published in many papers. However, conventionally, there are many problems to be solved in achieving stable synchronization of the synchronizing burst with a sync window as will be described hereinbelow.

SUMMARY OF THE INVENTION

Accordingly, it is an object of this invention to provide an improved synchronizing burst transmission phase control system capable of rapidly synchronizing the synchronizing burst with the sync window and enabling to attain a stable normal synchronous state even when the clock frequencies of the satellite and of the synchronizing device of an earth station differ greatly.

Another object of this invention is to provide a novel synchronizing burst transmission phase control system capable of improving the flexibility of processing the metric pattern and being applied to a SDMA/SS-TDMA system utilizing a multiphase PSK modulation system.

According one aspect of this invention, there is provided synchronizing burst transmission phase control system for use in a satellite communication system based on an SDMA/SS-TDMA scheme utilizing a plurality of spot beams corresponding to up and down link, and having a communication satellite for switching line connections between the up and down links in a predetermined connection mode, and a plurality of earth stations intercommunicating via the satellite through time division multiplexed connection, at least one of said plurality of earth stations being set as a communication reference station which establishes and maintains a TDMA frame between earth stations corresponding to said plurality of spot beams, said communication reference station comprising: first means responsive to a synchronizing burst of a predetermined period, which is transmitted from said reference station to said satellite by taking a period corresponding to said TDM frame as a reference, gated off by a sync window for control of the TDMA frame formed on the basis of a predetermined reference time in said satellite and then returned to said reference station, to measure a symbol length of a metric pattern which has passed through said sync window and is received correctly, and to compare the measured symbol length with a predetermined reference symbol length to thereby determine a transmission timing error; second means responsive to an output of said first means, for controlling a transmission timing of the synchronizing burst; and third means for switching a symbol length of the supervisory metric pattern in accordance with a synchronous state of said synchronizing burst.

According to another aspect of this invention, there is provided a system for use in a satellite communication system based on an SDMA/SS-TDMA scheme utilizing a plurality of spot beams corresponding to up and down links and having a communication satellite for switching line connections between said up and down links in a predetermined connection mode, and a plurality of earth stations intercommunicating via said satellite through time division multiplexed connection, at least one of said plurality of earth stations being set as a communication reference station which establishes and maintains a TDMA frame between earth stations corresponding to said plurality of spot beams, said communication reference station comprising: metric pattern memory means responsive to a predetermined synchronizing burst signal, which is transmitted from said reference station to said satellite by taking a period corresponding to said TDM frame as a reference, gated off by a sync window for control of the TDMA frame formed on the basis of a predetermined reference time in said satellite and then returned to said reference station, to store n (an integer larger than 1) metric patterns, each consituting a portion of said synchronizing burst signal; symbol weighting means for comparing said metric pattern read out from said memory means with a predetermined reference metric pattern for each symbol and extracting a predetermined weight coefficent for each symbol corresponding to the result of said comparison; weight coefficient integrating means for integrating n times said weight coefficient for each symbol; symbol threshold value judging means for extracting a predetermined K (an integer larger than 1) number of level identification signals related to a receiving threshold level for each symbol by comparing an integrated level of said weight coefficient integrating means with a predetermined reference level; and symbol timing judging means for measuring a symbol length of a metric pattern of a time region gated by said sync window by referrring to said K level identification signal for each symbol and forming a phase difference signal corresponding to a symbol length shift extracted by comparing said measured symbol length with a predetermined reference symbol length.

BRIEF DESCRIPTION OF THE DRAWINGS

In the accompanying drawings:

FIGS. 5a, 5b and 5c respectively show waveforms of a metric pattern at the time of transmission, of a sync window and of the metric pattern at the time of receiving and demodulation;

FIGS. 6a to 6c respectively show the sync window, a synchronizing burst sent out immediately after determining an approximate transmission timing by a low power signal, and a synchronizing burst in the normal synchronous state;

FIG. 7 diagrammatically shows the synchronizing burst utilized in this invention;

FIG. 8a shows a sync window;

FIG. 8b shows the synchronizing burst of this invention which is sent out immediately after determining an approximate transmitting time by a low power signal;

FIG. 8c shows the synchronizing pulse of this invention under normal synchronous state;

FIG. 8d shows the synchronizing burst utilized in a modified embodiment of this invention under normal synchronous state;

DESCRIPTION OF THE PREFERRED EMBODIMENTS

Prior to the description of the invention, a prior art SDMA/SS-TDMA system will first be described. At present, this system is expected to be used abundantly in future as a satellite communication system constituted by a large capacity satellite and plurality of earth stations. One example of the prior art SDMA/SS-TDMA system is schematically shown in FIG. 1 which shows the relationship among essential elements in a communication satellite and a plurality of earth stations in four spot areas, for example.

Figure 1:
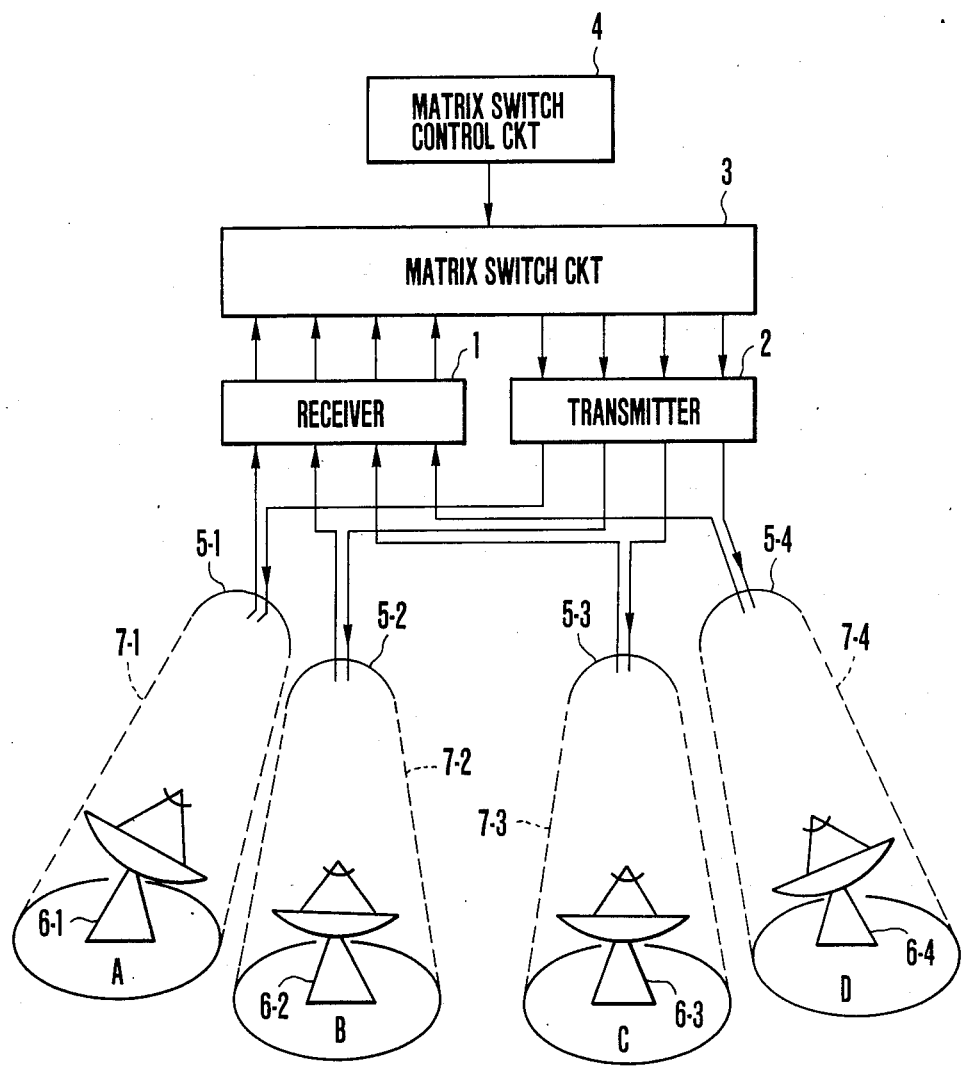
FIG. 1 is a diagrammatic representation of a SDMA/SS-TDMA system.

In FIG. 1, for the purpose of description only one earth station is installed in each spot area on the earth corresponding to respective spot beams of the communication satellite, but it should be understood that the invention is not limited to this specific arrangement.

As shown in FIG. 1, the communication satellite is mounted with a receiver 1, a transmitter 2, a matrix switch circuit 3, a matrix switch control circuit 4 and spot beam antennas 5-1 to 5-4, and on the earth are installed earth stations 6-1 to 6-4 corresponding to four spot areas A, B, C and D.

It is now assumed that the earth station 6-1 in the spot area A is a predetermined reference station of the SDMA/SS-TDMA system. When a predetermined TDMA frame is established and when the system is in the normal operating state, the electric waves transmitted for communication from the earth stations 6-1 to 6-4 are respectively received by corresponding spot beam antennas 5-1 to 5-4 and then frequency converted and amplified by the on-board receiver 1 to be applied to the matrix switch circuit 3. These received signals are applied to the on-board transmitter 2 through the matrix switch circuit 3 controlled by the matrix switch control circuit 4, and are amplified to predetermined transmission power levels. These transmitting power levels are sent to the corresponding spot areas A to D through spot beams 7-1 to 7-4 radiated from spot beam antennas 5-1 to 5-4.

Figures 2, 3:
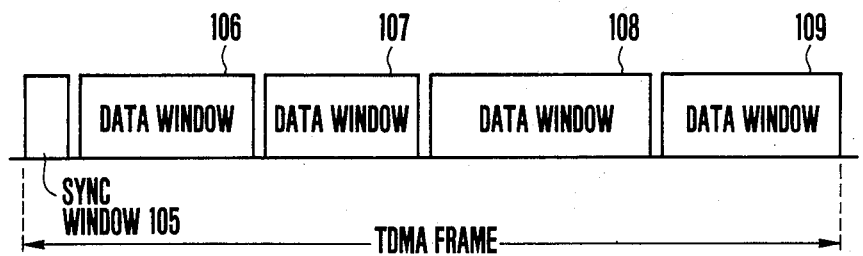
FIG. 2 shows one example of the TDMA frame.
FIG. 3 is a chart showing one example of the connection mode.

In this case, connection modes I, II, III and IV as shown in FIG. 3 are set for up link and down link respectively corresponding to a TDMA frame as shown in FIG. 2, for example, so as to control the switching of the communication lines periodically and on the time division basis. The example of the TDMA frame shown in FIG. 2 is constituted by a sync window 105 forming a time slot adapted to synchronize the communication satellite and the reference station, and data windows 106, 107, 108 and 109 forming time slots for interconnection between predetermined ones of the earth stations 6-1 to 6-4. In FIG. 3, a symbol SBA represents the spot beam antenna so that SBA(1), SBA(2), SBA(3) and SBA(4) respectively correspond to the spot beam antennas 5-1, 5-2, 5-3 and 5-4 shown in FIG. 1. In one example of the connection modes shown in FIG. 3, the time division (TD) communication lines between respective spot areas through the communication satellite corresponding to the connection modes I, II, III and IV are as follows:

I ... A→A, B→B, C→C, D→D

II ... A→B, B→C, C→D, D→A

III ... A→C, B→D, C→A, D→B

IV ... A→D, B→A, C→B, D→C

More particularly, the SDMA/SS-TDMA is formed between the spot areas A, B, C and D through the four connection modes and through the medium of the communication satellite based on the respective time slots of the TDMA frame shown in FIG. 2.

As described above, in order to form a SDMA/SS-TDMA system, it is essential to establish and maintain the TDMA frame. In the case of a prior art satellite communication system utilizing the TDMA system, the time slot standard necessary for the TDMA system is established by using one or more of the earth stations as reference stations, by transmitting the reference burst signal by taking a period corresponding to a TDMA frame as a reference according to a reference time signal prepared in the reference stations and by receiving the reference burst signal with the respective earth stations via the communication satellite.

In the case of the SDMA/SS-TDMA system, however, since the switching control of the matrix switch circuit 3 according to a predetermined connection mode is effected in synchronism with a reference time signal contained in the matrix switch control circuit 4, it is necessary for the reference station to form its own time reference in synchronism with the reference time signal of the matrix switch control circuit 4 in the satellite. Of course, the distance between the communication satellite and the reference station varies slowly with time even when a stationary satellite is used. Consequently, the synchronism described above means that the time reference of the reference station itself should be constantly controlled and adjusted by referring to the time reference in the satellite such that a signal transmitted from the reference station in accordance with the time reference thereof would always be in synchronism with the time reference in the communication satellite. As a countermeasure for this, a synchronizing burst transmission phase control system has been proposed as a means for establishing the TDMA frame in the SDMA/SS-TDMA system and for maintaining the frame.

Figure 4:
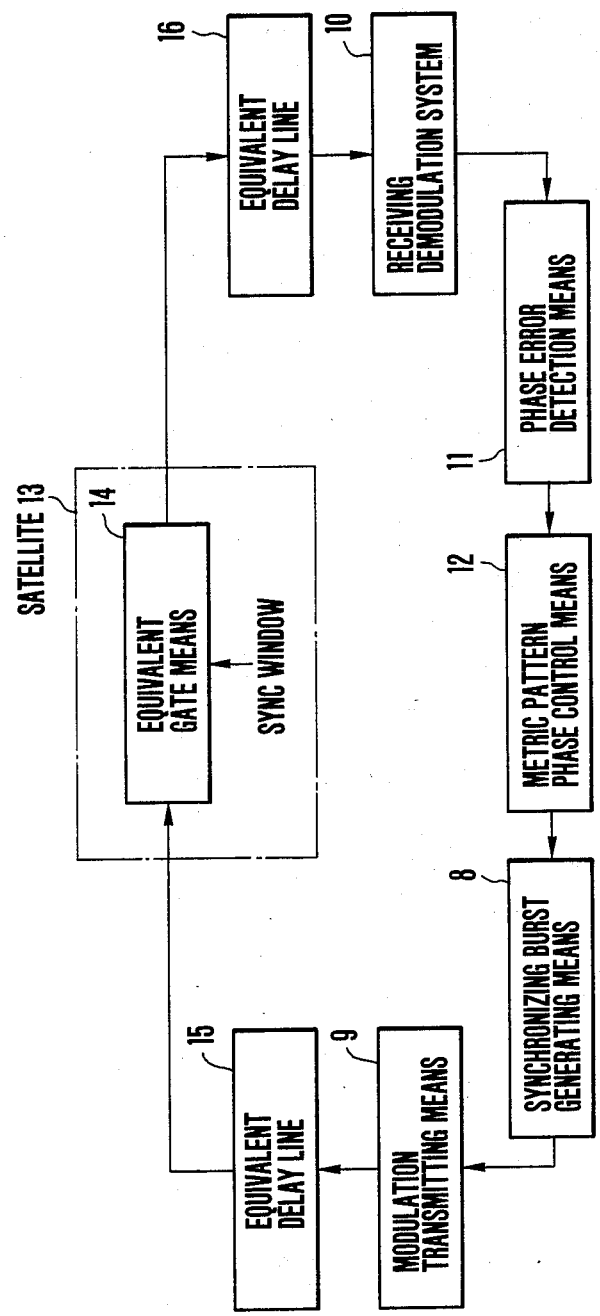
FIG. 4 is a block diagram showing an overall construction of a synchronizing burst transmission phase control system.

FIG. 4 is a block diagram showing the principal parts of the synchronizing burst transmission phase control system. As shown in FIG. 4, the reference earth station is provided with a synchronizing burst generating means 8, a modulation transmitting system 9, a receiving demodulation system 10, a phase error detecting means 11 and a metric pattern phase control means 12, while an equivalent gate means 14 is provided in the communication satellite. Furthermore, there exist equivalent delay lines 15 and 16 for propagation paths corresponding to the up link and the down link.

In FIG. 4, the synchronizing burst generating means 8 outputs a predetermined synchronizing burst signal formed by taking the reference time signal in the reference station as the base, and the synchronizing burst signal is applied to the equivalent gate means 14 via the modulation transmitting system 9 and the equivalent delay line 15. In the equivalent gate means 14, the synchronizing burst signal is gated by the sync window which is formed and inputted by taking the reference time signal in the communication satellite as the base so that the synchronizing burst signal is sent back to the reference station through the equivalent delay line 16. One example of the synchronizing burst signal is shown in FIG. 5a which corresponds to a case wherein a phase shift keying (PSK) modulation system is used for modulating a carrier wave. In this case, the fore end of the synchronizing burst signal is provided with a preamble made up of a not modulated carrier wave that is a continuous wave (CW) which acts to extract the carrier wave on the receiving side, and a portion modulated by a predetermined bit timing recovery signal (BTR) which acts to extract a clock pulse. Following the preamble is a modulated portion constituted by a portion modulated by a predetermined synchronizing signal, that is, a unique word (UW) and a metric pattern (METRIC) comprising a predetermined bit timing recovery (BTR) signal utilized to measure a time phase error.

Where the synchronizing burst transmission is operating normally, the synchronizing burst signal sent back to a predetermined reference station via the equivalent delay propagation path 16 in a manner as above described is inputted to the receiving modulating system 10 in the form of the metric patten with its latter half gated off or cut off at the rear edge 100 of the sync window shown in FIG. 5b which is formed by taking the time reference in the satellite as the base. In the receiving demodulation system 10, this synchronizing burst signal is demodulated by two-phase, four-phase or multiphase PSK phase demodulation operation to form a synchronizing burst signal comprising, as shown by solid lines in FIG. 5c, a unique word (UW) and a metric pattern (METRIC) with its rear half cut off at a time position 102. The demodulated synchronizing burst signal is sent to the phase error detecting means 11 which detects the rear edge 100 of the sync window shown in FIG. 5b and the time position 102, corresponding to the rear edge 100, of the gated off rear edge portion of the metric pattern (METRIC) of the synchronizing burst signal shown in FIG. 5c so as to extract the time difference between the time position 102 and the reference time position set at the center time position of the metric pattern (METRIC). The time difference thus extracted is outputted as a phase error signal of the synchronizing burst transmission phase control system. This phase error signal is sent to the synchronizing burst generating means 8 through the metric pattern phase control means 12 so as to control the phase of the synchronizing burst signal formed by the synchronizing burst generating means 8. Succeeding operation is the same as that already described. The phase of the synchronizing burst signal is controlled and adjusted by the synchronizing burst transmission phase control system formed by a closed loop shown in FIG. 4 such that the phase error signal outputted from the phase error detecting means 11 will be zeroed, thereby establishing and maintaining a TDMA frame synchronous with the sync window in the communication satellite. A voltage controlled oscillator or a frequency divider may be used for controlling the phase of the synchronizing burst generating means 8.

The synchronizing burst transmission phase control system is described in detail in R. A. Rapuano and N. Shimasaki paper entitled "Synchronization of Earth Stations to Satellite-Switched Sequences" A.I.A.A. 4th "Communication Satellite Systems Conference", April 1972. Where the time position 102 of the gated off rear edge portion of the metric pattern (METRIC) utilized for metering is to be detected, due to error factors caused by the wave characteristic at the read edge portion 100 (FIG. 5b) of the sync window and the signal to noise ratio of the transmission system including the up link and down link, the time position of the rear edge of the detected metric pattern (METRIC) would include an ambiguous time region.

For the purpose of eliminating such an ambiguity, a method of determining the symbol length of a correctly received metric pattern has been proposed comprising the steps of storing in a metric pattern memory means, n (an integer larger than 1) measured metric patterns each constituting a portion of each synchronizing burst signal, reading the metric patterns from the metric pattern memory means, comparing, for each symbol, the read metric pattern with a predetermined metric pattern, integrating results of comparison for each symbol directly or after converting the results into predetermined weight coefficients for the purpose of correcting the error producing characteristic of the transmission path, and then comparing and collating the integrated value of each symbol with a predetermined reference value.

Usually, the length of the synchronizing burst is selected to be about 1 microsecond, that of the metric pattern is selected to be about 16 symbols, and that of the sync window is selected to be about 5 microseconds.

Where the synchronizing burst is precisely synchronized with the sync window, it will be controlled as explained with reference to FIGS. 5a to 5c.

However, at the time of firstly sending the synchronizing burst to the communication satellite from an earth station, the position of the sync window is usually searched by using a low power signal, and after an approximate position of the transmission timing has been determined with the low power signal, the synchronizing burst is transmitted.

A method of determining an approximate timing of the transmission timing with the low power signal is disclosed in Japanese Patent Publication No. 1817/1981 so that it will not be described herein in detail.

Since in the method of determining the transmission timing with the low power signal, the signal is received by limiting the band width by using a narrow band signal to improve the signal to noise ratio, a substantial error (of the order of +1 microsecond) can not be avoided.

Accordingly, where the synchronizing burst is sent out after determining the transmission timing with the low power signal, the synchronizing burst is controlled such that it will occupy a position near the center of the sync window as shown in FIG. 6b, and after the unique word (UW) of the transmitted burst has been detected, the synchronizing burst will be shifted toward rear symbol by symbol until a normal synchronous state is reached as shown in FIG. 6c. FIG. 6a shows the timing of the sync window. Since the metric pattern is detected based on the receiving timing of the unique word (UW), the shift of the synchronizing burst should be made such that the unique word (UW) should always be in the sync window.

Since, before assuming correct synchronous state, it is impossible to accurately match the clock frequency that controls the matrix switch on the satellite with the clock frequency of the ground synchronizing device, the sync window and the synchronizing burst will differ slightly due to the difference in the clock frequencies even when no control is peformed.

Accordingly, in order to move the synchronizing burst from the state shown in FIG. 6b to that shown in FIG. 6c for the purpose of preventing the unique word from going out of the sync window due to the drift caused by the difference in the clock frequency, the synchronizing burst is shifted toward the rear side by ½ of the length of the metric pattern.

To shift the synchronizing burst, many times of measurement and control are necessary. The control is effected at a period (hereinafter termed a transmission control period) corresponding to the sum of the delay time (about 0.3 sec.) caused by the sum of the time required for electric wave to go and return between the earth station and the satellite and the transmission timing error detection time, resulting in a defect that a long time is required until the state shown in FIG. 6c is reached.

Furthermore, according to the prior art system, where the clock frequency difference is large, even after the rear edge of the sync window has been controlled such that the rear edge will be positioned at the center of the metric pattern, there is a defect that the unique word goes out of the sync window or the rear edge of the sync window goes out of the metric pattern.

Moreover, in order to synchronize the two blocks, the difference in the clock frequencies of the satellite and the synchronizing device of the earth station is eliminated by integrating the difference between the corrected transmission timing quantity and the measured transmission timing error, converting the integrated difference into the frequency difference so as to correct the oscillation frequency of the clock oscillator of the satellite or the clock oscillator of the synchronizing device on the ground.

However, as described above where the sync window goes out of the metric pattern, or where the unique word goes out of the sync window, since it is impossible to measure the transmission error, it is necessary to make extremely small the difference between the clock frequency of the satellite and that of the synchronizing device of the earth station.

In the following description, the state in which the rear edge of the sync window can be detected in the metric pattern and in which the above-described control is effected for synchronizing the clock frequency of the satellite and that of the synchronizing device of the earth station is called a normal synchronous state.

To prevent ambiguous time position of the rear edge of the detected metric pattern, where a two phase modulation system is used, there has been proposed a method comprising the steps of comparing each bit of the metric pattern of the received and demodulated metric pattern with a corresponding bit of the original metric pattern, detecting coincidence or noncoincidence of each metric bit corresponding to a number of measuring times and determining the time position of the rear edge of the metric pattern according to the theory of decision by majority of the detected data of a number of measurements so as to improve the performance of the phase error detecting means of the synchronizing burst transmission phase control system.

This prior art synchronizing burst transmission phase control system, however, utilizes a method of directly processing the metric pattern of the received and demodulated measuring signal with a hardware logic device so that such processing system lacks flexibility. Moreover, this method is not applicable to a SDMA/SS-TDMA system utilizing a multiphase (more than 4 phases) PSK modulation system.

One of the characteristics of this invention lies in that a sufficiently long metric pattern as shown in FIG. 7 and FIG. 8b is used for decreasing the number of transmission controls required for the metric pattern to reach the rear edge of the sync window, and that the metric pattern is divided into two regions (MET1 and MET2) as shown in FIG. 7 so as to shorten the time for reaching the normal synchronous state by controlling the transmission while supervising the receiving state of the two regions of the metric pattern when the synchronism between the synchronizing burst and sync window is unstable.

FIG. 8a shows the timing of the sync window.

After reaching the normal synchronous state, as shown in FIG. 8c, the transmission timing is controlled such that the rear end of the sync window will be positioned at the center of the rear region (METE) of the metric pattern so as to minimize the burst length extending to the outside of the sync window thereby limiting the metric pattern to the rear region (METE) of the metric pattern, thus shortening the time required for metric pattern detection. This is the second characteristic of this invention.

More particularly, by making sufficiently long the total symbol length of MET1 and MET2, it becomes possible to detect the rear end of the sync window at the center of the metric pattern (MET1 or MET2).

Even when the clock frequency of the satellite is different from that of the synchronizing device of the earth station, it is possible to prevent the unique word from going out of the sync window and to prevent the rear end of the sync window from going out of the metric pattern.

As has been well known, the difference in the clock frequencies of the satellite and of the synchronizing device in the earth station can be eliminated by integrating the difference between a corrected quantity of transmission timing and a measured transmission timing error, converting the integrated quantity into a frequency difference, and then correcting the oscillation frequency of a clock oscillator of the satellite or of the clock oscillator of the synchronizing device of the earth station with the frequency difference.

After the transmission timing and the difference in the clock frequencies of the satellite and of the synchronizing device of the earth station have been made sufficiently small, the amount of shift of the rear end of the sync window from the reference position can usually be reduced to less than several symbols within one transmission control period.

When control of the transmission timing continues until the sync window will lie at the center of the metric pattern, about ½ of the metric pattern will go out of the sync window and such portion can not be used for actual communication of the other stations.

As can be noted from FIGS. 8a to 8c, about 3 microseconds are necessary for the metric pattern and one half thereof, that is, 1.5 microseconds correspond to about 100 symbols when the clock frequency utilized for communication is 65 MHz.

According to this invention, after the normal synchronous state has been reached, a control is made such that the rear end of the sync window is positioned at the center of the rear region (MET2) of the metric pattern. About 16 symbols is sufficient for the rear region, under this state, the length of the metric pattern on the outside of the sync window can be limited to about 8 symbols.

As described above, detection of the correctly received portion of the metric pattern is made by processing a plurality of receiving states for respective symbols so that as the length of the metric pattern increases, the processing time also increases, giving rise to an increased transmission control period. Longer is the transmission control periods, the greater is the transmission timing error of the synchronizing burst.

According to this invention, the detection processing of the metric pattern is limited to only the region MET2, thus enabling to shorten the processing time as well as the transmission control period of the synchronizing burst.

The invention will now be described in detail with reference to the accompanying drawing.

Figure 9:
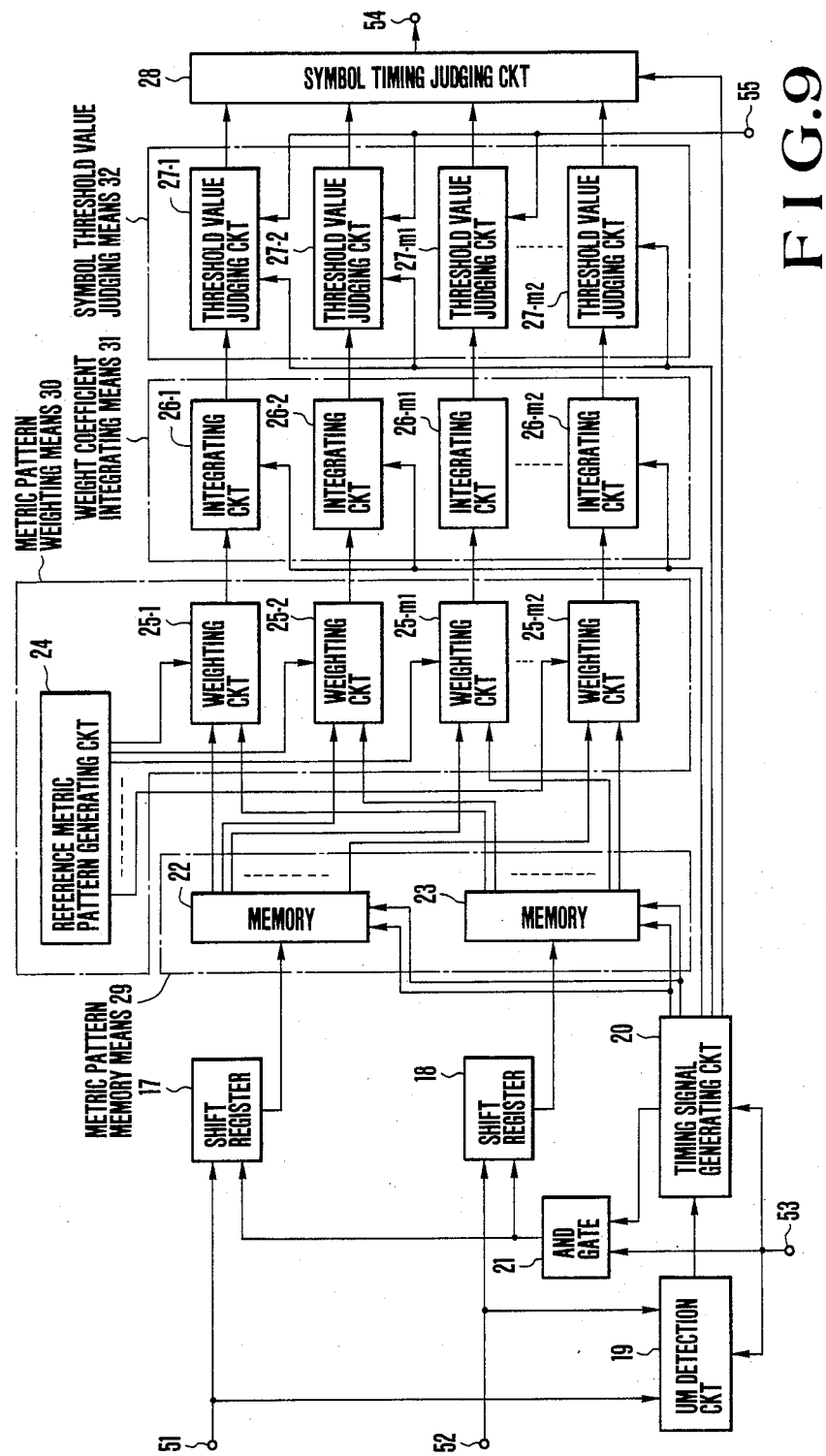
FIG. 9 is a block diagram showing one example of the phase error detection means utilized in this invention.

FIG. 9 is a block diagram showing one example of the time phase error detecting means utilized in this invention. As shown, this time phase error detecting means comprises shift registers 17 and 18 for P channel and Q channel, respectively, a UW detection circuit 19, a timing signal generator 20, an AND gate circuit 21, a metric pattern memory means 29 including memories 22 and 23 for P channel and Q channel, respectively, a reference metric pattern weighting means 30 including a reference metric pattern generating circuit 24 and weighting circuits 25-1 to 25-m2, weight coefficient integrating means including integrating circuits 26-1 to 26-m2, symbol threshold value judging means 32 including threshold value judging circuits 27-1 to 27-m2, and a symbol timing judging circuit 28. As a modulation system for a carrier wave, this phase error detecting means corresponds to a case wherein the 4-phase PSK is applied. In FIG. 9, m1 represents the number of symbols of the front region (MET1) of the metric pattern, whereas m2 represents the number of symbols in the entire metric pattern (MET1 and MET2). Generally, m1 and m2 are integers larger than 1.

In FIG. 9, synchronizing burst signals sent from the receiving and demodulation system and corresponding to channels P and Q are inputted into input terminals 51 and 52 and respectively sent to shift register 17 and UW detection circuit 19, and shift register 18 and UW detection circuit 19. Shift registers 17 and 18 temporarily store the metric patterns (METRIC) of the synchronizing burst signals of channels P and Q. Under the control of the reference signal inputted through a terminal 53, the UW detection circuit 19 detects the unique words (UW) shown in FIG. 8 of the synchronizing burst signal for channels P and Q inputted to terminals 51 and 52 and outputs a UW detection signal which is applied to the timing signal generating circuit 20. The circuit 20 responds to the UW detection signal and the predetermined reference clock signal inputted through the terminal 53 to produce a predetermined first timing signal which is supplied to one input of the AND gate circuit 21. In the same manner, the timing signal generating circuit 20 applies the second, third and fourth timing signals to the integrating circuits 26-1 to 26-m2, the threshold value judging circuits 27-1 to 27-m2, and the symbol timing judging circuit 28, while a predetermined address signal and a write/read control signal are sent to each of the memories 22 and 23.

The AND gate circuit 21 is inputted with the reference clock signal supplied through terminal 53, and the first timing signal sent from the timing signal generating circuit 20, for producing a reference clock signal corresponding to the first timing signal, the reference clock signal being sent to the shift registers 17 and 18. The shift registers 17 and 18 sequentially output under the control of the reference clock signal, the temporarily stored metric patterns of channels P and Q which in turn are sent to the memories 22 and 23, respectively. The memories 22 and 23 are responsive to the address signal and the write control signal sent from the timing signal generating circuit 20 to store in their predetermined addresses n metric patterns of the channels P and Q. Thereafter, the n metric patterns stored in the predetermined addresses of the memories P22 and Q23 are sequentially read out as parallel signals under the control of the address signal and read control signal sent from the timing signal generating circuit 20. The signals thus read out are sent to the weighting circuits 25-1 to 25-m2 for each symbol. In this case, since the number of symbols of the metric pattern METRIC (MET1 and MET2) is assumed to be m2, it is necessary to provide m2 weighting circuits. In the same manner, the integrating circuit 26-1 to 26-m2 and the threshold value judging circuits 27-1 to 27-m2 which are connected to the weighting circuits 25-1 to 25-m are needed to haved m2 components, respectively.

The weighting circuits 25-1 to 25-m2 are inputted with the parallel outputs, in the form of symbols each comprising one bit, of the metric patterns (METRIC) of respective channels which are read out from the memories 22 and 23 under the control of the read control signal outputted from the timing signal generating circuit 20, and a predetermined reference metric pattern outputted from the reference metric pattern generating circuit 24 so as to compare and collate the input metric patterns at each symbol to thereby set and extract predetermined weight coefficients corresponding to the result of comparison and send the extracted weight coefficients to corresponding integrating circuits 26-1 to 26-m2. These weight coefficients are, for example, set in the following manner.

Let us denote the symbols corresponding to a j-th bit of the metric pattern read out from the memories 22 and 23 at the time of an i-th measurement by ($a_{ij}$, $b_{ij}$) and denote the symbols after comparison of the symbols $a_{ij}$ and $b_{ij}$ with the reference metric pattern by ($\overline{a_{ij}}$, $\overline{b_{ij}}$). The weight coefficients $\alpha_0$, $\alpha_1$, $\alpha_2$ and $\alpha_3$ are set as shown in the following table in accordance with the rate of occurrence of "1" or "0" in $\overline{a_{ij}}$ and $\overline{b_{ij}}$.

| $\overline{a_{ij}}$ | $\overline{b_{ij}}$ | Weight Coefficients |
| --- | --- | --- |
| 0 | 0 | $\alpha_0$ |
| 0 | 1 | $\alpha_1$ |
| 1 | 0 | $\alpha_2$ |
| 1 | 1 | $\alpha_3$ |

For example, the weight coefficients shown in this table are sent, corresponding to the symbols ($a_{ij}$, $b_{ij}$), to integrating circuits 26-1 to 26-m2 respectively and accummulated for respective symbols for a number of measurements under the control of the control signal from the timing signal generating circuit 20. Where the number of measurement is n, n weight coefficients are added. In the case described above, the accummulated value of the weight coefficients outputted from the integrating circuits 26-1 to 26-m2 is expressed by the following $$\sum_{i=1}^{n} \alpha_k \{(a_{ij}, b_{ij})\} \ (k = 0 \text{ to } 3)$$

$$i = 1, 2 \ldots n$$

$$j = 1, 2 \ldots m$$

The threshold value judging circuits 27-1 to 27-m2 are supplied with the accummulated values of the weight coefficients respectively outputted from the integrating circuits 26-1 to 26-m2 for respective symbols, for comparing the accummulated value with a predetermined reference level under the control of the control signal inputted from the timing signal generating circuit 20 so as to output 3-level identification signals from respective threshold value judging circuits 27-1 to 27-m2. The time positions 103 and 104 of the metric pattern shown in FIG. 8c shows one example of the correspondence between the time position on the metric pattern and reference the level for 3-level identification, when the outputs of the threshold value judging circuits 27-1 to 27-m2 are 3-level identification signals. For example, where the 3-level identification reference levels are denoted by L1 and L2, the following general equations hold, $$\sum_{i=1}^{n} \alpha_k [(a_{ij}, b_{ij})] \ (k = 0 \text{ to } 3) < L1 \quad j = 1, 2 \ldots l,$$

$$L1 \leq \sum_{i=1}^{n} \alpha_k [(a_{ij}, b_{ij})] \ (k = 0 \text{ to } 3) < L2$$

$$(j = l + 1, l + 2 \ldots l + p)$$

$$L2 \leq \sum_{i=1}^{n} \alpha_k [(a_{ij}, b_{ij})] \ (k = 0 \text{ to } 3)$$

$$(j = l + p + 1, l + p + 2 \ldots m2)$$

As can be noted from these equations, the time positions 103 and 104 shown in FIGS. 8b and 8c correspond to the boundary position between an l-th symbol and an (l+1)-th symbol of the metric pattern and the boundary position between an (l+p)-th symbol and an (l+P+1)-th symbol, respectively.

After the synchronizing burst has reached the normal synchronous state, a signal 55 indicative of normal synchronism is applied to the threshold judging circuits 27-1 to 27-m1 corresponding to the fore region (MET1) of the metric pattern from an external control circuit. The outputs of these threshold value judging circuits 27-1 to 27-m1 are set to values not exceeding L1 irrespective of the input to the respective integrating circuits 26-1 - 26-m1, that is, to a state in which all symbols are correctly received.

The 3-level identification signals outputted from the corresponding threshold value judging circuits 27-1 to 27-m2 of respective symbols are inputted to the symbol timing judging circuit 28. These m2 3-level identification signals are arithmetically processed for detecting the time position (102 shown in FIGS. 8b and 8c) at which the metric pattern is gated off by the sync window and measuring the time position 102 and a length of the symbols corresponding to the time position 102 shown in FIG. 8c. As a result, the time displacement from a predetermined reference symbol length is extracted, thereby outputting an error voltage corresponding to the time displacement as a phase error voltage of the synchronizing burst transmission phase control system. This phase error voltage is sent to the metric pattern phase control means 12 shown in FIG. 4 for controlling and adjusting the phase of the synchronizing burst signal formed by the synchronizing burst generating means. Accordingly, the synchronizing burst transmission phase control system operates such that the phase error voltage is zeroed and the transmission phase of the synchronizing burst signal is maintained at a predetermined phase at which the time position corresponding to the reference symbol length of the metric pattern (METRIC) will follow the time position 102 (See FIGS. 8b and 8c) of the rear edge gated off by the sync window, for establishing and maintaining the TDMA frame of the SDMA/SS-TDMA system in a manner as above described.

Before the synchronizing burst reaches the normal synchronous state, the reference symbol length of the metric pattern is selected to reach the center of the entire metric pattern (MET1 and MET2). After the synchronizing burst has reached the normal synchronous state, the symbol length is selected to reach the center of the rear region (MET2) of the metric pattern.

Even after the normal synchronous state has reached, where it becomes necessary to greatly correct the transmission timing in such a case as the clock frequencies of the satellite and of the synchronizing device in the earth station differ and are required to be corrected, it is possible to resume the normal synchronous state in a short time by executing the operation to be done before reaching the normal synchronous state.

Although, in the foregoing description, the invention was applied to a SDMA/SS-TDMA system utilizing a 4-phase PSK modulation system, it should be understood that the invention can be efficiently applied to a system utilizing four or more multiphase PSK modulation system.

Furthermore, according to this invention, since the metric pattern is once stored in memory means and then sequentially subjected to logical processings, reading and processing the metric pattern can be made independently of the processings of the TDMA frame and of the symbol rate thereof so that the processing of the metric pattern can be made with a microprocessor.

Where the microprocessor is applied to this invention, all of the m weighting circuits, m threshold value judging circuit and symbol timing judging circuits described above can be realized with a single microprocessor utilizing suitable software.

In this case, after the synchronizing burst has reached the normal synchronous state, the processings corresponding to the m weighting circuits and m threshold value judging circuits may be limited to a portion corresponding to the rear region (MET2) of the metric pattern so as to greatly decrease the processing time.

Figure 10:
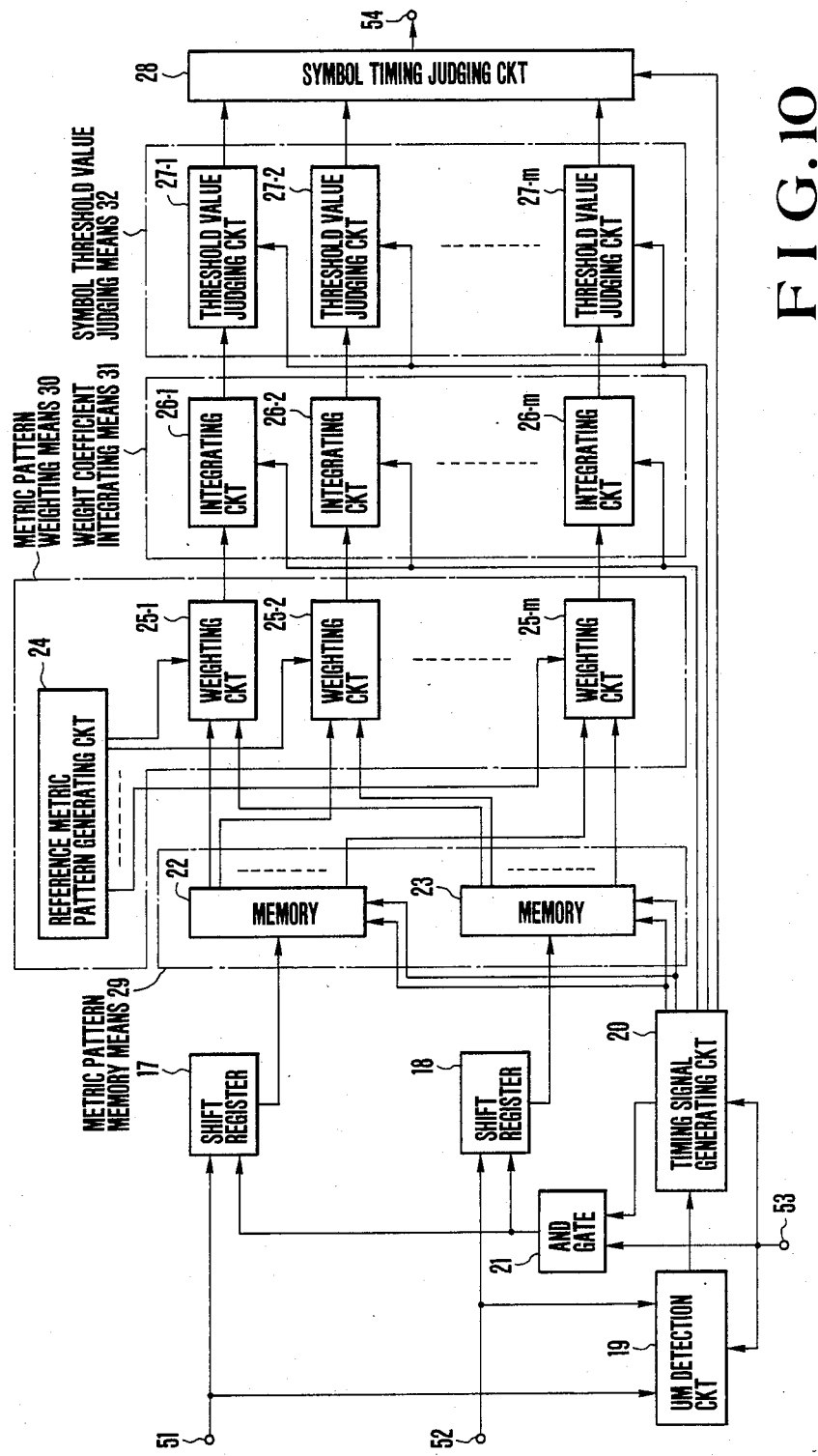
FIG. 10 is a block diagram showing a modified phase error detection means as applied for the FIG. 8d synchronizing burst.

The invention is also applicable to a system of transmitting a short synchronizing burst equal to the symbol length of the region MET2 of the metric pattern after the synchronizing burst has reached the normal synchronous state. Such a modified system is illustrated in FIG. 10 wherein the number of symbols in the region MET2 is assumed to be m and components corresponding to those of FIG. 9 are denoted by identical reference numerals. In addition, the terminal for the normal synchronism indication signal 55 is not necessary in this modification. Obviously, this modification operates in a similar manner to the system of the previous embodiment.

As described above in detail, when the invention is applied to the satellite communication system of the SDMA/SS-TDMA system, it is possible to greatly decrease the time for bringing the synchronizing burst into precise synchronism with the sync window after an approximate transmission timing has been determined. More particularly, it is possible to greatly decrease the time for recovering the synchronism of the system, thus improving the reliability thereof.

Moreover, as it is possible to apply the invention to a system utilizing a microprocessor, the size of the apparatus can be reduced and the change of the parameters can be made economically.

What is claimed is:

1. A synchronizing burst transmission phase control system for use in a satellite communication system based on a space division multiple access/satellite switching-time division multiple access (SDMA/SS-TDMA) scheme utilizing a plurality of spot beams corresponding to up and down links and having a communication satellite which switches line connections between said up and down links in a predetermined connection mode with a predetermined TDMA frame period, and produces a sync window and a plurality of data windows on the basis of a predetermined reference time in said satellite, and a plurality of earth stations intercommunicating via said satellite through a time division multiplexed connection, at least one of said plurality of earth stations being set as a reference station which establishes and maintains synchronization between earth stations corresponding to said plurality of spot beams, said reference station comprising:
transmitting means for transmitting a predetermined synchronizing burst toward said satellite by taking the period corresponding to said TDMA frame as a reference;
receiving means for receiving the synchronizing burst transmitted by said transmitting means and returned from said satellite through said sync window;
first means responsive to the synchronizing burst received by said receiving means, for measuring a symbol length of a metric pattern which has passed through said synch window and is received correctly, and to compare the measured symbol length with a predetermined reference symbol length to thereby determine a transmission timing error;
second means responsive to an output of said first means for controlling a transmission timing of the synchronizing burst; and
third means for switching a symbol length of the metric pattern to be supervised in accordance with a synchronous state of said synchronizing burst.

2. The synchronizing burst transmission phase control system according to claim 1 further comprising means for dividing said metric pattern into two regions (MET1 and MET2) and means for supervising receiving states of said two regions of said metric pattern for controlling transmission, thereby reducing a time required for resuming a normal synchronous state.

3. The synchronizing burst transmission phase control system according to claim 1 further comprising means for controlling said transmission timing such that a rear end of said sync window will be positioned at a center of a rear region (MET2) of said metric pattern.

4. A synchronizing burst transmission phase control system for use in a satellite communication system based on a space division multiple access/satellite switching-time division multiple access (SDMA/SS-TDMA) scheme utilizing a plurality of spot beams corresponding to up and down links and having a communication satellite which switches line connections between said up and down links in a predetermined connection mode with a predetermined period which is referred as a TDMA frame, and produces a sync window and a plurality of data windows on the basis of a predetermined reference time in said satellite, and a plurality of earth stations intercommunicating via said satellite through time division multiplexed connection, at least one of said plurality of earth stations being set as a reference station which establishes and maintains synchronization between earth stations corresponding to said plurality of spot beams, said reference station comprising:
transmitting means for transmitting a predetermined synchronizing burst signal toward said satellite by taking the period corresponding to said TDMA frame as a reference;
receiving means for receiving the synchronizing burst signal transmitted by said transmitting means and returned from saaid satellite through the sync window;
metric pattern memory means responsive to the predetermined synchronizing burst signal received by said receiving means for storing n, an integer larger than 1, metric patterns, each constituting a portion of said synchronizing burst signal;
symbol weighting means for comparing said metric pattern read out from said memory means with a predetermined reference metric pattern for each symbol and extracting a predetermined weight coefficient for each symbol corresponding to the result of said comparison;
weight coefficient integrating means for integrating n times said weight coefficient for each symbol;
symbol threshold value judging means for extracting a predetermined K, an integer larger than 1, number of level identification signals related to a receiving threshold level for each symbol by comparing an integrated level of said weight coefficient integrating means with a predetermined reference level; and
symbol timing judging means for measuring a symbol length of a metric pattern of a time region gated by said sync window by referring to said K-level identification signals for each symbol and forming a phase difference signal corresponding to a symbol length shift extracted by comparing said measured symbol length with a predetermined reference symbol length;
control means for controlling a transmitting phase of said synchronizing burst signal according to said phase difference signal.

5. A synchronizing burst transmission phase control system according to claim 4 wherein said symbol timing judgement means comprises control means for changing said reference symbol length from which said phase difference signal is calculated.

6. A synchronizing burst transmission phase control system according to claim 4 comprising a time division multiple access burst timing control subsystem means controlled by said phase difference signal.

* * * * *